US011964345B2

(12) United States Patent
Sendelbach

(10) Patent No.: US 11,964,345 B2
(45) Date of Patent: Apr. 23, 2024

(54) MOVING UNIT FOR MOVING TWO SOLDERING ASSEMBLIES FOR PROCESSING CIRCUITS BOARDS, AND SOLDERING SYSTEM FOR SELECTIVE WAVE SOLDERING WITH A MOVING UNIT

(71) Applicant: ERSA GmbH, Wertheim (DE)

(72) Inventor: Markus Sendelbach, Karbach (DE)

(73) Assignee: ERSA GmbH, Wertheim (DE)

( * ) Notice: Subject to any disclaimer, the term of this patent is extended or adjusted under 35 U.S.C. 154(b) by 0 days.

(21) Appl. No.: 17/735,704

(22) Filed: May 3, 2022

(65) Prior Publication Data

US 2022/0355423 A1 Nov. 10, 2022

(30) Foreign Application Priority Data

May 7, 2021 (DE) ..................... 10 2021 112 047.0

(51) Int. Cl.
| | | |
|---|---|---|
| *B23K 1/00* | (2006.01) | |
| *B23K 1/08* | (2006.01) | |
| *B23K 3/00* | (2006.01) | |
| *B23K 3/06* | (2006.01) | |
| *B23K 37/02* | (2006.01) | |
| *B23K 101/36* | (2006.01) | |

(52) U.S. Cl.
CPC ........ *B23K 37/0229* (2013.01); *B23K 1/0008* (2013.01); *B23K 1/085* (2013.01); *B23K 3/0653* (2013.01); *B23K 37/0247* (2013.01); *B23K 2101/36* (2018.08)

(58) Field of Classification Search
CPC .............. B23K 37/0229; B23K 1/0008; B23K 37/0247; B23K 37/0211; B23K 3/0653; B23K 1/0016; B23K 2101/36–42; B23K 1/08–085; B23K 3/06–0692
USPC ....................................... 228/33, 37, 42, 260
See application file for complete search history.

(56) References Cited

U.S. PATENT DOCUMENTS

| | | | | |
|---|---|---|---|---|
| 4,030,717 A | * | 6/1977 | Serlovsky | H05K 13/0069 269/118 |
| 5,067,433 A | * | 11/1991 | Doll, Jr. | H05K 3/3468 118/500 |
| 5,340,011 A | * | 8/1994 | Sanchez | B23K 20/004 228/49.5 |
| 6,119,915 A | * | 9/2000 | Thompson, Sr. | B23K 3/0676 228/56.5 |
| 7,257,887 B2 | * | 8/2007 | Lee | H01L 21/67138 29/760 |
| 10,933,483 B2 | * | 3/2021 | Prentice | H05K 13/0469 |
| 2002/0170945 A1 | * | 11/2002 | Shafie | H01L 21/4853 228/103 |

(Continued)

FOREIGN PATENT DOCUMENTS

| | | | |
|---|---|---|---|
| AT | 006396 U1 | | 3/2000 |
| CN | 2443579 Y | * | 8/2001 |

(Continued)

OTHER PUBLICATIONS

Examination Report of DE 10 2021 112 047.0 pp. 1-7.

*Primary Examiner* — Kiley S Stoner
(74) *Attorney, Agent, or Firm* — George R. McGuire

(57) ABSTRACT

Moving unit for moving two soldering assemblies connected by a coupling device, soldering system for selective wave soldering of circuit boards with such a moving unit, and associated method.

13 Claims, 2 Drawing Sheets

(56) References Cited

U.S. PATENT DOCUMENTS

2012/0273559 A1 * 11/2012 Patterson ................ B23K 3/08
228/8

FOREIGN PATENT DOCUMENTS

| CN | 2629388 Y * | 7/2004 | |
| --- | --- | --- | --- |
| CN | 100382662 C * | 4/2008 | |
| CN | 101160196 A * | 4/2008 | ........... B23K 1/0016 |
| CN | 103752978 A * | 4/2014 | ............. B23K 1/085 |
| CN | 103769714 A * | 5/2014 | ............. B23K 3/00 |
| CN | 106513915 A * | 3/2017 | ............. B23K 1/085 |
| CN | 206461848 U * | 9/2017 | |
| CN | 109483004 A * | 3/2019 | ........... B23K 1/0008 |
| CN | 112045268 A * | 12/2020 | |
| CN | 112122832 A * | 12/2020 | ............. B23K 31/02 |
| CN | 112570845 A * | 3/2021 | |
| CN | 113130375 A * | 7/2021 | ............. B23K 37/00 |
| CN | 113275694 A * | 8/2021 | ............... B23K 3/08 |
| CN | 113600956 A * | 11/2021 | |
| CN | 113714707 A * | 11/2021 | |
| CN | 214627535 U * | 11/2021 | |
| CN | 215468667 U * | 1/2022 | |
| CN | 114083079 A * | 2/2022 | |
| CN | 114192923 A * | 3/2022 | |
| CN | 114669815 A * | 6/2022 | |
| DE | 102004062866 A1 | 6/2006 | |
| DE | 102004063488 A1 | 12/2006 | |
| DE | 102008035314 A1 | 1/2010 | |
| DE | 102007019453 B4 | 7/2012 | |
| DE | 102015219611 A1 | 4/2017 | |
| DE | 102019211763 A1 * | 2/2020 | ........... B23K 1/0016 |
| EP | 3153270 B1 | 12/2019 | |
| GB | 2325092 A * | 11/1998 | ............... B23K 1/20 |
| GB | 2399310 A * | 9/2004 | ............. B23K 1/085 |
| KR | 20220008660 A * | 1/2022 | |
| WO | 2014086954 A1 | 6/2014 | |

* cited by examiner

MOVING UNIT FOR MOVING TWO SOLDERING ASSEMBLIES FOR PROCESSING CIRCUITS BOARDS, AND SOLDERING SYSTEM FOR SELECTIVE WAVE SOLDERING WITH A MOVING UNIT

CROSS REFERENCE TO RELATED APPLICATIONS

The present application relates and claims priority to German Application Number 10 2021 112 047.0, filed May 7, 2021, the entire disclosure of which is hereby incorporated herein by reference in its entirety.

BACKGROUND

The invention relates to a moving unit for moving two soldering assemblies movably arranged along an x-axis and a y-axis running perpendicular thereto for processing circuit boards. For processing the circuit boards, the soldering assemblies can each have or be formed by a soldering device, in particular a solder pot having a solder nozzle, a spray unit (fluxer), a camera and/or a cleaning unit. Furthermore, axis drives are provided for moving the soldering assemblies along the x-axis and/or the y-axis. The invention also relates to a soldering system having such a moving unit.

In the field of contacting electronic components which are fastened, for example, by means of through-hole technology (THT) from an upper side of a circuit board through a bore in the circuit board, it is known to contact the components from an underside of the circuit board.

So-called selective wave soldering is known for contacting individual pins or pin rows by soldering, in which a circuit board or a pin to be contacted is positioned exactly over a soldering assembly having a soldering device that comprises a standing wave of liquid solder. Before the soldering process, it is also known to use a spray unit to first spray flux onto the pins/pin rows to be soldered during the so-called fluxing in order to improve the wetting of the solder, wherein individual pins or pin rows are then soldered by spot soldering.

It is known from EP 3 153 270 B1 to provide two soldering assemblies which can be moved independently of one another along the x-axis, the y-axis, and the z-axis by means of controllable actuating devices. Even though such a structure allows for very flexible processing of the circuit boards, it is very expensive to realize overall. In particular, an absolutely synchronous moving of the soldering assemblies can technically only be realized at great expense.

From DE 10 2004 063 488 A1, a moving unit having the features of the preamble of claim 1 is known. The moving unit has a carrier that is movable along the x-axis and on which a bridge movable along the y-axis is arranged. Two soldering assemblies are located on the bridge, so that the two soldering assemblies can be freely positioned along the x- and y-axes. The soldering assemblies can also be moved in the z-direction via actuating devices.

SUMMARY OF THE INVENTION

The problem addressed by the present invention is that of developing the initially described moving unit such that the circuit boards can be processed flexibly, wherein a synchronous moving of the soldering assemblies is also to be made possible overall in a simple manner.

This problem is solved by a moving unit having:

Therefore, it is provided that one carriage is provided for each of the at least two soldering assemblies. Each of the at least two soldering assemblies can thus be arranged on its own carriage. For processing the circuit boards, the soldering assemblies can each have or be formed by a soldering device, in particular a solder pot having a solder nozzle, a spray unit (fluxer), a camera and/or a cleaning unit. Furthermore, the at least two carriages are arranged to be movable on a common linear guide along the x-axis or the y-axis, wherein the at least two carriages are connected to one another by means of a coupling device such that, when one of the carriages is moved by an axis drive, the at least other carriage is also moved. By providing the coupling device, which allows for a rigid connection of the two carriages, a synchronous movement of the carriages along the x-axis or the y-axis can be made possible. It is thus provided in particular that only one of the carriages is driven directly by means of the axis drive; the other carriage is moved exclusively via the coupling device. Consequently, it is also possible to provide only one axis drive, with which both soldering assemblies can be moved along the x-axis or the y-axis due to their coupling to the coupling device.

The coupling device provided between the two carriages can be designed such that it is designed to adjust the distance between the at least two carriages. Depending on the circuit board to be processed, the two carriages, and thus the two soldering assemblies, can have a different distance in the x-direction and/or in the y-direction.

The coupling device can be adjusted manually or via a drive on the side of the coupling device.

It is conceivable that the coupling device is designed such that the distance between the at least two carriages is adjustable during operation of the moving unit. For adjusting the distance, the coupling device can provide a controllable drive, for example an electric motor. If circuit boards of different sizes are processed successively during operation, the distance between the carriages and thus the distance between the soldering assemblies can be varied depending on the circuit board to be processed.

The control of the drive can also be designed such that the two carriages are not moved synchronously during processing, which can be realized by appropriate adjustment of the coupling device. According to this design, the two carriages can therefore be moved independently and differently in the x-direction or the y-direction due to the superimposed movement of the axis drive and the drive of the coupling device.

The coupling device can comprise a rotatable spindle rod which interacts with at least one spindle nut provided on at least one of the two carriages in order to adjust the distance between the at least two carriages. By turning the spindle rod which, for example, can be driven by an electric motor, the distance between the two carriages changes. For example, the spindle rod can be rotatably mounted on a carriage at one end and mounted in the spindle nut on another carriage at the other end; it is conceivable that the spindle rod is mounted on both carriages by means of spindle nuts, wherein the spindle rod then provides a right-hand thread interacting with one nut and a left-hand thread interacting with the other nut.

In another embodiment, the coupling device can comprise a toothed rack which interacts with at least one adjusting pinion provided on at least one of the two carriages in order to adjust the distance between the at least two carriages. For example, the toothed rack can at one end be firmly fastened to a carriage and at the other end interact with the pinion. By turning the pinion, which can be done by a motor, the distance between the two carriages changes accordingly.

In a further embodiment, the coupling device comprises a drivable, preferably closed, belt which interacts with the at least two carriages in order to adjust the distance between the at least two carriages. It is conceivable that the belt is driven by a belt drive that can be driven by a motor, so that, when the belt drive is actuated, the at least two carriages are moved towards one another or away from one another.

It is also conceivable that a distance measuring device is provided with which the distance between the two carriages, and thus the distance between the two soldering assemblies, can be determined. Precisely when a motor drive is provided for adjusting the distance between the carriages, a defined distance between the two carriages can be specified via a control loop.

It is also advantageous if the coupling device comprises at least one spring element that pushes one carriage towards the least one other carriage or away from the at least one other carriage, so that the distance between the at least two carriages is adjusted against a pretension of the at least one spring element. As a result, an exact positioning of the two carriages relative to one another is conceivable.

The linear guide can be designed such that it comprises one, two, or a plurality of guide rails running parallel to one another. The rails can have a distance, so that even larger or heavier soldering assemblies can be moved safely in the x-direction or the y-direction.

Furthermore, it is advantageous if the axis drive for moving the at least one carriage is provided at the free end of the linear guide, or at the free end of at least one guide rail. In this case, the drive can comprise a belt which runs within the linear guide and preferably within the guide rail and which is motion-coupled to at least the at least one carriage.

It is also conceivable that the linear guide itself is movably mounted by means of bearing elements on a transverse guide running perpendicular to the linear guide. In particular, if the linear guide runs along the x-axis, the transverse guide runs along the y-axis. Conversely, it is conceivable that, if the linear guide runs along the y-axis, the transverse guide runs along the x-axis. By superimposing the movements in the x-direction and the y-direction, the two soldering assemblies can be freely positioned, in particular synchronously. If the coupling device has its own drive, at least one of the two carriages can carry out a superimposed movement in the x-direction or the y-direction by appropriately controlling the drive.

Correspondingly to the linear guide, the transverse guide can comprise one, two, or a plurality of guide rails running parallel to one another. It has proven to be advantageous if three guide rails are provided and if a corresponding axis drive is provided on the central guide rail in order to move the linear guide along the transverse direction. The axis drive can comprise an electric motor and a closed belt driven by the electric motor, said belt being preferably arranged to run within the transverse guide or a guide rail of the transverse guide.

It is also advantageous if the soldering assemblies are each arranged to be movable independently of one another along a z-axis running perpendicular to the x-axis and the y-axis on the respective carriages and if a separately controllable z-axis drive is provided on each carriage. As a result, the at least two soldering assemblies can be raised or lowered independently of one another in the z-direction, i.e., in the vertical direction.

The problem initially addressed is also solved by a soldering system for selective wave soldering of circuit boards, wherein the circuit boards are transportable through the soldering device along a movement direction running along the x-axis, and wherein the soldering system has a moving unit according to the invention for moving at least two soldering assemblies.

The problem initially addressed is also solved by a method for operating a moving unit according to the invention or a soldering system according to the invention, wherein the at least two carriages with the two soldering assemblies are moved on a common linear guide along the x-axis or the y-axis, and wherein the individual circuit boards are processed simultaneously by means of the two soldering assemblies.

BRIEF DESCRIPTION OF THE DRAWINGS

Further details and advantageous embodiments of the invention can be found in the following description, on the basis of which one embodiment of the invention will be described and explained in more detail.

In the drawings.

DETAILED DESCRIPTION

Figure 1:
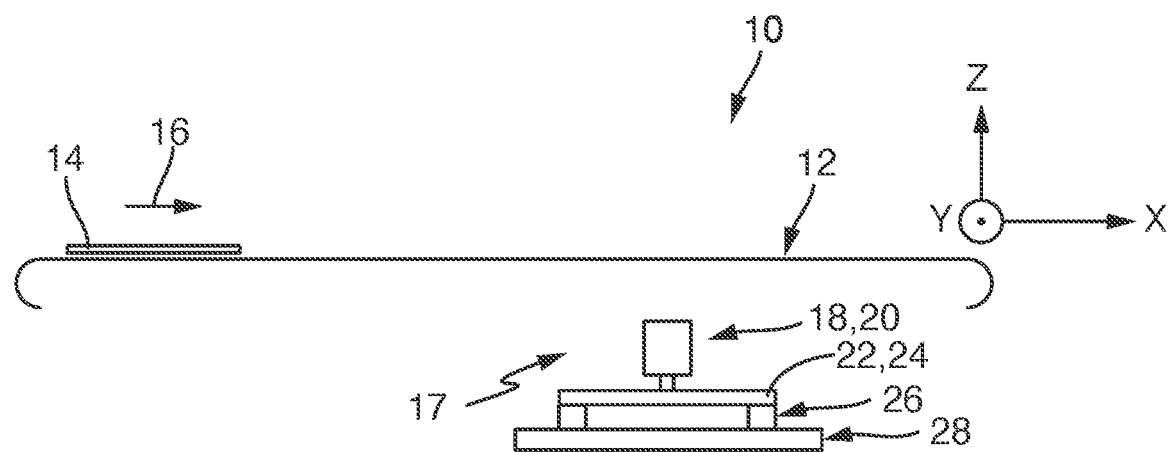
FIG. 1 is a side view of a schematic representation of a soldering system for selective wave soldering.

The soldering system 10 for wave soldering shown schematically in FIG. 1 has a device 12 for transporting a circuit board 14 fitted with electronic components along a transport direction 16 which extends in the direction of an x-axis. A y-axis extends perpendicular to the x-axis and perpendicular to the plane of the page. A z-axis extends perpendicular to the x-axis and the y-axis. For the sake of simplicity, the electronic components on the circuit board 14 are not shown.

The transport device 12 can comprise, for example, a chain conveyor that circulates continuously and on which the circuit boards 14 are mounted and guided in the region of their longitudinal side edges such that the underside of the circuit boards 14 is essentially freely accessible.

A moving unit 17 is provided below the transport device 14, which comprises two soldering assemblies 18, 20 arranged one behind the other in the y-direction, so that only one of the soldering assemblies 18, 20 can be seen in FIG. 1; the rear soldering assembly 20 is covered by the front soldering assembly 18. The soldering assemblies 18, 20 are, in particular, soldering devices with a pot and a solder nozzle, as shown in FIGS. 2 and 3.

Each of the soldering assemblies 18, 20 is each arranged on its own carriage 22, wherein the carriages 22, 24 are movable on a common linear guide 26 along the y-axis. The linear guide 26 itself is arranged to be movable on a transverse guide 28 along the x-axis.

Figure 2:
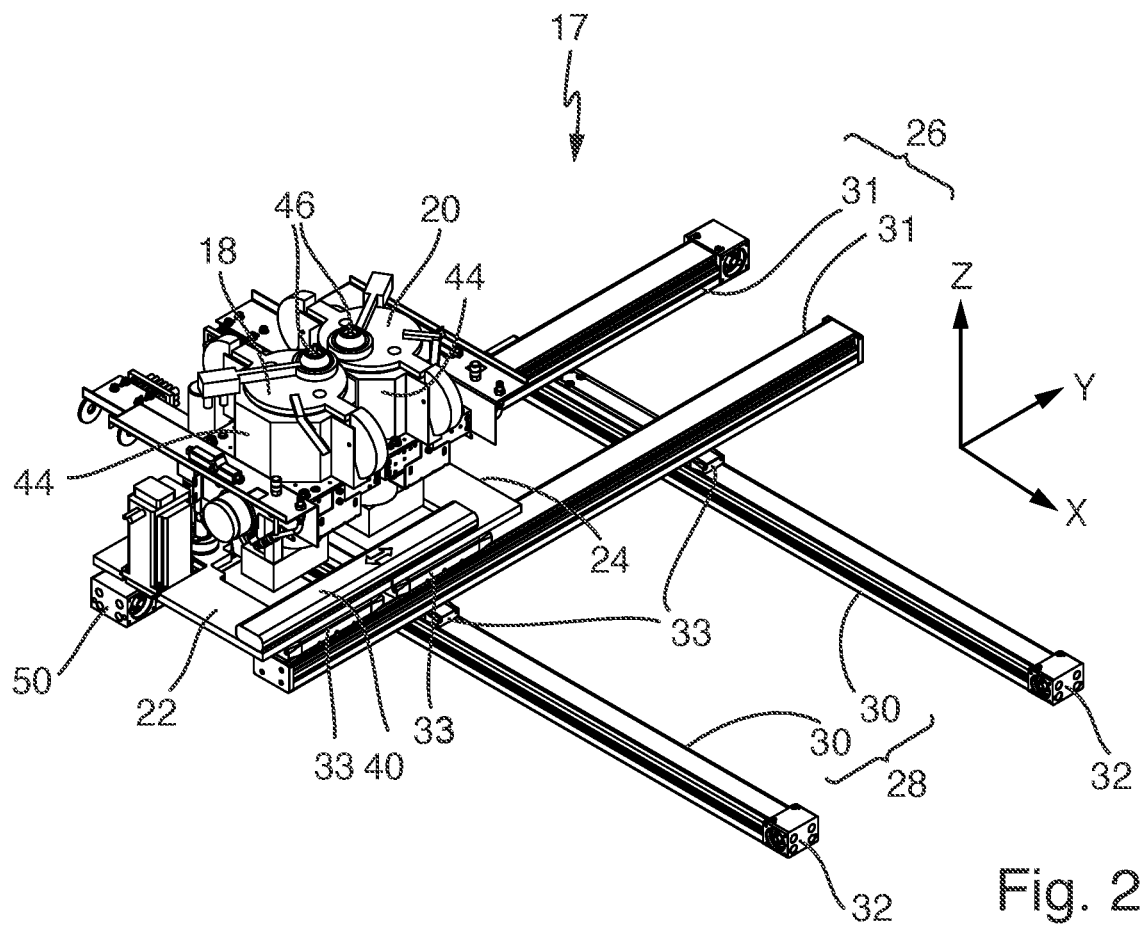
FIG. 2 is an isometric view of a moving unit for the wave soldering system according to FIG. 1.
Figure 3:
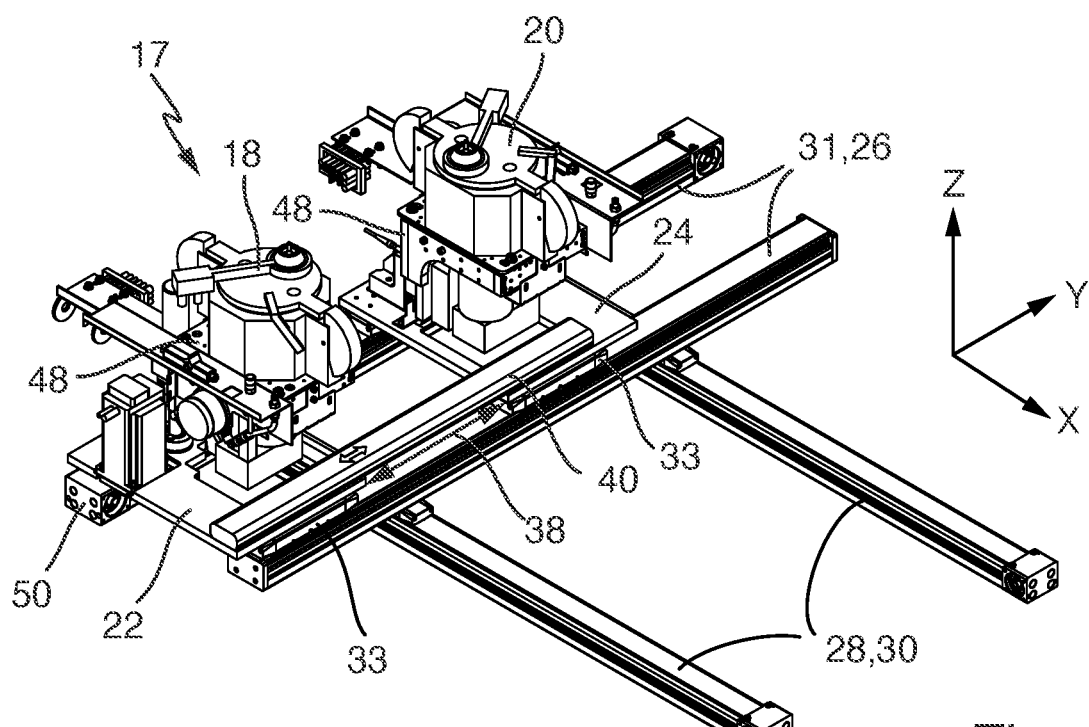
FIG. 3 shows the moving unit according to FIG. 2 in a different operating position.

While the moving unit 17 is shown only schematically in FIG. 1, FIGS. 2 and 3 show the moving unit 17 in two different operating states.

As is clear from FIGS. 2 and 3, the moving unit 17 comprises the transverse guide 28 with two guide rails 30 running parallel to one another. The linear guide 26, which in turn has two guide rails 31, is provided perpendicularly to the transverse guide 28 along the y-axis.

For moving the linear guide 26 on the transverse guide 28 with as little friction as possible, bearing elements 33 can be provided between the guide rails 30 and the guide rails 31. Correspondingly, bearing elements 33 can be provided between the carriages 22 and 24 and the guide rails 31 of the linear guide 26. The bearing elements can in particular have rolling elements in order to effect a play-free and yet low-friction movability of the individual components.

The guide rails 30 of the transverse guide 28, which extend along the x-axis, are preferably arranged in a stationary manner. The transverse guide 28 has two synchronously controllable axis drives 32 which are provided on the free ends of the guide rails 30 of the transverse guide 28. The axis drives 32 can provide circulating belts that run within the guide rails 30 and are coupled to the linear guide 26 or its guide rails 31, so that the linear guide 26 as such can be moved along the x-axis.

On the linear guide 26, or the associated guide rails 31, the two carriages 22, 24 are arranged to be movable along the y-axis.

For coupling the movement of the two carriages 22, 24, a coupling device 40 is provided which, on one side, engages in carriage 22 and on the other side engages in carriage 24. The coupling device 40 is designed such that it can be used to adjust a distance 38 between the two carriages 22, 24 (cf. FIG. 4 with the associated description). In FIG. 2, the distance 38 is adjusted such that it is minimal or equal to zero; FIG. 3 shows a comparatively great distance 38 of several centimeters between the two carriages 22, 24.

A soldering assembly 18 is provided on each of the two carriages 22, 24, each of which comprising a solder pot 44 and a solder nozzle 46 provided on the solder pot 44. The soldering assemblies 18 are designed such that they can be used to solder electronic components on the circuit board 14 from below. During operation, a standing wave of liquid solder emerges from the solder nozzles 46 and is positioned via the moving unit 17 such that the assemblies to be soldered or their pins or pin rows to be contacted are soldered by means of the solder wave.

In the embodiment shown in FIGS. 1, 2, and 3, the soldering assemblies 18 comprise the respective solder pot 44 with the solder nozzle 46. It is conceivable that, in addition to or instead of the solder pot 44, spray units (fluxers) for spraying flux onto the circuit boards 14, cameras for detecting the underside of the circuit board and/or cleaning units for cleaning the underside of the circuit board before and/or after the soldering process are provided.

The arrangement of the soldering assemblies 18 on the carriages 22, 24 is such that the soldering assemblies are movable independently of one another on the respective carriages 22, 24 along a z-axis arranged perpendicularly to the y-axis and the x-axis. For this purpose, suitable z-axis drives 48 are provided on the carriages 22, 24.

A y-axis drive 50 is provided on at least one of the guide rails 31 of the linear guide 26 for moving the carriages 22, 24 along the y-axis. The axis drive 50, correspondingly to the axis drives 32, can have an electric motor and a closed belt which runs within the corresponding guide rail 31 and is motion-coupled to one of the two carriages 22, 24. Consequently, if the y-axis drive 50 is activated, the carriage 22 coupled directly to the y-axis drive 50 is driven. Due to the coupling device 40, carriage 24 is moved synchronously when carriage 22 is moved.

The movement of the two carriages 22, 24 in the y-direction is basically synchronous. However, it is conceivable for the distance 38 between the two carriages 22, 24 to be adjusted during the movement of one carriage 22 by means of the coupling device 40, so that carriage 24 is moved relative to carriage 22.

Figure 4:
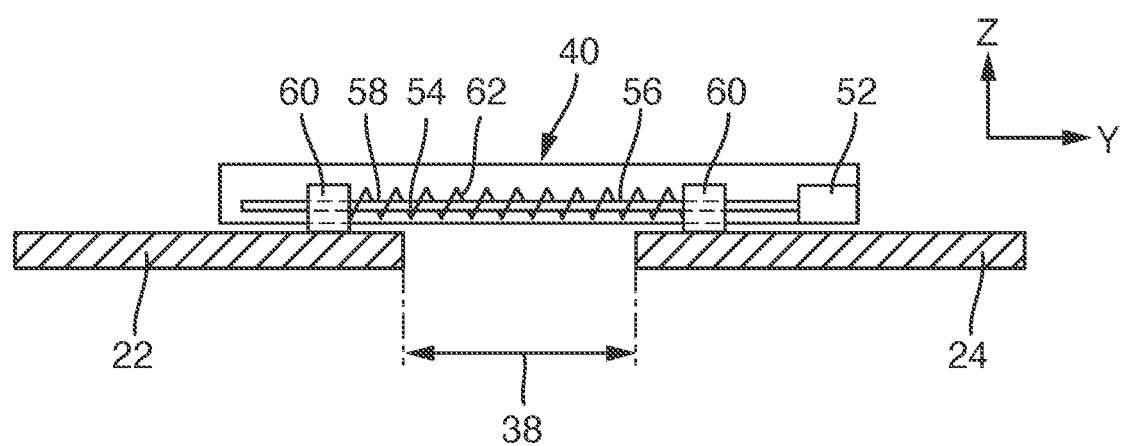
FIG. 4 shows a longitudinal section of a coupling device as shown in FIG. 2 or 3.

FIG. 4 shows a longitudinal section along the y-axis of a conceivable coupling device 40 with the two carriages 22, 24. The two carriages 22, 24 have the distance 38 in the y-direction. The coupling device 40 has a spindle rod 54 rotatable by means of an electric motor 52. The spindle rod 54 has a left-hand thread portion 56 and a right-hand thread portion 58, which each interact with a spindle nut 60 arranged on the respective carriage 22, 24. If the electric motor 52 is activated, and depending on the rotational direction of the electric motor 52, the two carriages 22 and 24 are thus moved towards or away from one another. In order to compensate for possible play between the components of the coupling device 40 in the y-direction, a spring element 62 can be provided, as shown in FIG. 4, which pushes the two carriages 22, 24 away from one another.

According to another embodiment, the coupling device can have a toothed rack instead of the spindle shaft 56, which is fastened to at least one of the two carriages 22, 24, wherein the toothed rack interacts with an adjusting pinion for adjusting the distance between the two carriages 22, 24. It is also conceivable that the coupling device 40 has a drivable belt which interacts with the two carriages 22, 24 for adjusting said carriages. The coupling device can also provide completely different drive means effecting a possible adjustment.

What is claimed is:

1. Moving unit for moving two soldering assemblies arranged to be moveable along an x-axis and a y-axis running perpendicular thereto for processing circuit boards, having axis drives for moving the soldering assemblies along the x-axis and/or the y-axis,
characterized in that
each of the at least two soldering assemblies is provided with its own carriage on which the respective soldering assembly can be arranged,
that the at least two carriages are arranged to be movable on a common linear guide along the x-axis or the y-axis, and
that the at least two carriages are connected to one another by a coupling device such that, when one of the carriages is moved by an axis drive the at least other carriage is also moved, wherein the coupling device is adapted to adjust the distance between the at least two carriages.

2. Moving unit according to claim 1, characterized in that the coupling device is designed such that the distance between the at least two carriages is adjustable during operation of the moving unit.

3. Moving unit according to claim 1, characterized in that the coupling device comprises a rotatable spindle rod which interacts with at least one spindle nut provided on at least one of the two carriages for adjusting the distance between the at least two carriages.

4. Moving unit according to claim 1, characterized in that the coupling device comprises a toothed rack which interacts with at least one adjusting pinion provided on at least one of the two carriages for adjusting the distance between the at least two carriages.

5. Moving unit according to claim 1, characterized in that the coupling device comprises a drivable belt which interacts with the at least two carriages for adjusting the distance between the at least two carriages.

6. Moving unit according to claim 1, characterized in that the coupling device comprises at least one spring element which pushes one carriage towards the least one other carriage or away from the at least one other carriage.

7. Moving unit according to claim 1, characterized in that the linear guide comprises at least two guide rails running parallel to one another.

8. Moving unit according to claim 1, characterized in that the axis drive for moving the at least one of two carriages is provided at a free end of the linear guide.

9. Moving unit according to claim 1, characterized in that the linear guide itself is movably mounted by bearing elements on a transverse guide running perpendicular to the linear guide.

10. Moving unit according to claim 9, characterized in that the transverse guide comprises at least two guide rails running parallel to one another.

11. Moving unit according to claim 1, characterized in that the soldering assemblies are each arranged independently of one another to be movable along a z-axis running perpendicular to the x-axis and the y-axis on the respective carriage and that a z-axis drive is provided on each carriage.

12. Soldering system for selective wave soldering of circuit boards, wherein the circuit boards are transportable through the soldering device along a movement direction running along the x-axis, comprising a moving unit arranged to be moveable along an x-axis and a y-axis running perpendicular thereto for processing circuit boards, having axis drives for moving the soldering assemblies along the x-axis and/or the y-axis, characterized in that each of the at least two soldering assemblies is provided with its own carriage on which the respective soldering assembly can be arranged, that the at least two carriages are arranged to be movable on a common linear guide along the x-axis or the y-axis, and that the at least two carriages are connected to one another by a coupling device such that, when one of the carriages is moved by an axis drive, the at least other carriage is also moved, wherein the coupling device is adapted to adjust the distance between the at least two carriages.

13. Method for operating a moving unit for a soldering system for selective wave soldering of circuit boards, wherein the circuit boards are transportable through the soldering device along a movement direction running along the x-axis, comprising a moving unit arranged to be moveable along an x-axis and a y-axis running perpendicular thereto for processing circuit boards, having axis drives for moving the soldering assemblies along the x-axis and/or the y-axis, characterized in that each of the at least two soldering assemblies is provided with its own carriage on which the respective soldering assembly can be arranged, that the at least two carriages are arranged to be movable on a common linear guide along the x-axis or the y-axis, and that the at least two carriages are connected to one another by a coupling device such that, when one of the carriages is moved by an axis drive, the at least other carriage is also moved, wherein the coupling device is adapted to adjust the distance between the at least two carriages, comprising the steps of moving the at least two carriages with the two soldering assemblies on a common linear guide along the x-axis or the y-axis and processing the individual circuit boards simultaneously by the two soldering assemblies.

\* \* \* \* \*